(12) United States Patent
Zhang et al.

(10) Patent No.: US 8,751,537 B1
(45) Date of Patent: Jun. 10, 2014

(54) INTEGRATED AND UNIFIED ONLINE HELP

(75) Inventors: Hongzhen Zhang, Southborough, MA (US); Munish Desai, Shrewsbury, MA (US); Patricia J. Knowlton, Wayland, MA (US); Paul J. Masalsky, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 709 days.

(21) Appl. No.: 12/894,506

(22) Filed: Sep. 30, 2010

(51) Int. Cl.
*G06F 17/30* (2006.01)
(52) U.S. Cl.
CPC .................................. *G06F 17/30* (2013.01)
USPC ............ 707/791; 707/802; 707/822; 707/828
(58) Field of Classification Search
CPC ....................................................... G06F 17/30
USPC ................................................... 707/600–899
See application file for complete search history.

(56) References Cited

U.S. PATENT DOCUMENTS

| | | | |
|---|---|---|---|
| 6,615,253 B1 * | 9/2003 | Bowman-Amuah | 709/219 |
| 6,950,990 B2 * | 9/2005 | Rajarajan et al. | 715/736 |
| 7,236,966 B1 * | 6/2007 | Jackson et al. | 1/1 |
| 2003/0227487 A1 * | 12/2003 | Hugh | 345/777 |
| 2010/0250497 A1 * | 9/2010 | Redlich et al. | 707/661 |

OTHER PUBLICATIONS

Masalsky, "Managing Technical Content in an Enterprise XML Authoring Environment," EMC Corporation, 2008, 24 pages.

* cited by examiner

*Primary Examiner* — Isaac M Woo
(74) *Attorney, Agent, or Firm* — BainwoodHuang

(57) ABSTRACT

An improved technique of providing content from a single point of entry to a user is presented. The technique includes providing, on a computerized device, a unified content database from a set of content databases including a first content database of a first application and a second content database of a second application. The technique also includes displaying, from the computerized device to the user, a navigation view based on the unified content database while the first and second applications run on the computerized device, the navigation view initially rendering a single access point for content to the user. The technique further includes updating the navigation view with content from the first and second content databases in response to navigation commands from the user, the unified content database identifying particular database entries in the first and second content databases based on the navigation commands from the user, each database entry including displayable content.

23 Claims, 7 Drawing Sheets

Figure 6

INTEGRATED AND UNIFIED ONLINE HELP

BACKGROUND

A conventional data storage system includes one or more storage platforms for storing data and a management server (i.e., a separate computer) for controlling and monitoring operations of the storage platforms.

When the conventional data storage system includes both network-based platforms (i.e., NAS devices) and SAN-based platforms, the management server typically runs separate platform-specific management applications to communicate with the platforms. In particular, the management server runs a NAS-platform management application to communicate with the network-based platforms, and a SAN-platform management application to communicate with the SAN-based platforms.

The NAS-platform management application typically offers a NAS-platform help service to the user of the management server. Similarly, the SAN-platform management application typically offers a SAN-platform help service to the user of the management server.

SUMMARY

An improved technique provides a user with unified content from multiple applications having separate content databases. The improved technique utilizes a unification data structure which enables the user to initially view a unified single access point for the content. From this access point, the user is able to navigate to further content from each content database. Such a technique is well suited for providing a unified help service to the user. For example, the technique can be used to provide, in a single navigation window, access to NAS-platform help from a NAS-platform management application and access to SAN-platform help from a SAN-platform management application.

Such a technique of providing content from a single point of entry to a user is presented as an embodiment of a method. The method includes providing, on a computerized device, a unified content data structure from a set of content databases including a first content database of a first application and a second content database of a second application. The method also includes displaying, from the computerized device to the user, a navigation view based on the unified content data structure while the first and second applications run on the computerized device, the navigation view initially rendering a single access point for content to the user. The method further includes updating the navigation view with content from the first and second content databases in response to navigation commands from the user, the unified content d data structure database identifying particular database entries in the first and second content databases based on the navigation commands from the user, each database entry including displayable content.

A further embodiment to the technique of providing content from a single point of entry to a user is presented as an apparatus. The apparatus includes a network interface, an input/output device, a memory, and a processor coupled to the memory. The processor is configured to provide a unified content data structure from a set of content databases including a first content database of a first application and a second content database of a second application, the set of content databases accessed via the network interface, the first application and second application accessed from the memory. The processor is further configured to display, on the input/output device, a navigation view based on the unified content data structure while the first and second applications run on the computerized device, the navigation view initially rendering a single access point for content to the user. The processor is also configured to update the navigation view with content from the first and second content databases in response to navigation commands from the user, the unified content data structure identifying particular database entries in the first and second content databases based on the navigation commands from the user, each database entry including displayable content.

A further embodiment to the technique of providing content from a single point of entry to a user is presented as a computer program product having a non-transitory computer readable storage medium which stores code to provide content from a single point of entry to a user. The code includes instructions to provide a unified content data structure from a set of content databases including a first content database of a first application and a second content database of a second application. The code also provides instructions to display a navigation view based on the unified content data structure while the first and second applications run on the computerized device, the navigation view initially rendering a single access point for content to the user. The code further includes instructions to update the navigation view with content from the first and second content databases in response to navigation commands from the user, the unified content data structure identifying particular database entries in the first and second content databases based on the navigation commands from the user, each database entry including displayable content.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 6 is a screenshot of a view showing a unified search table according to the improved technique.

DETAILED DESCRIPTION

An improved technique of providing content to a user includes integrating the online help services from each of the individual applications into a unified help service accessed from the single point of entry. By integrating the online help services in this way, the user can access the online help services for the individual applications from a single point of entry.

Figure 1:
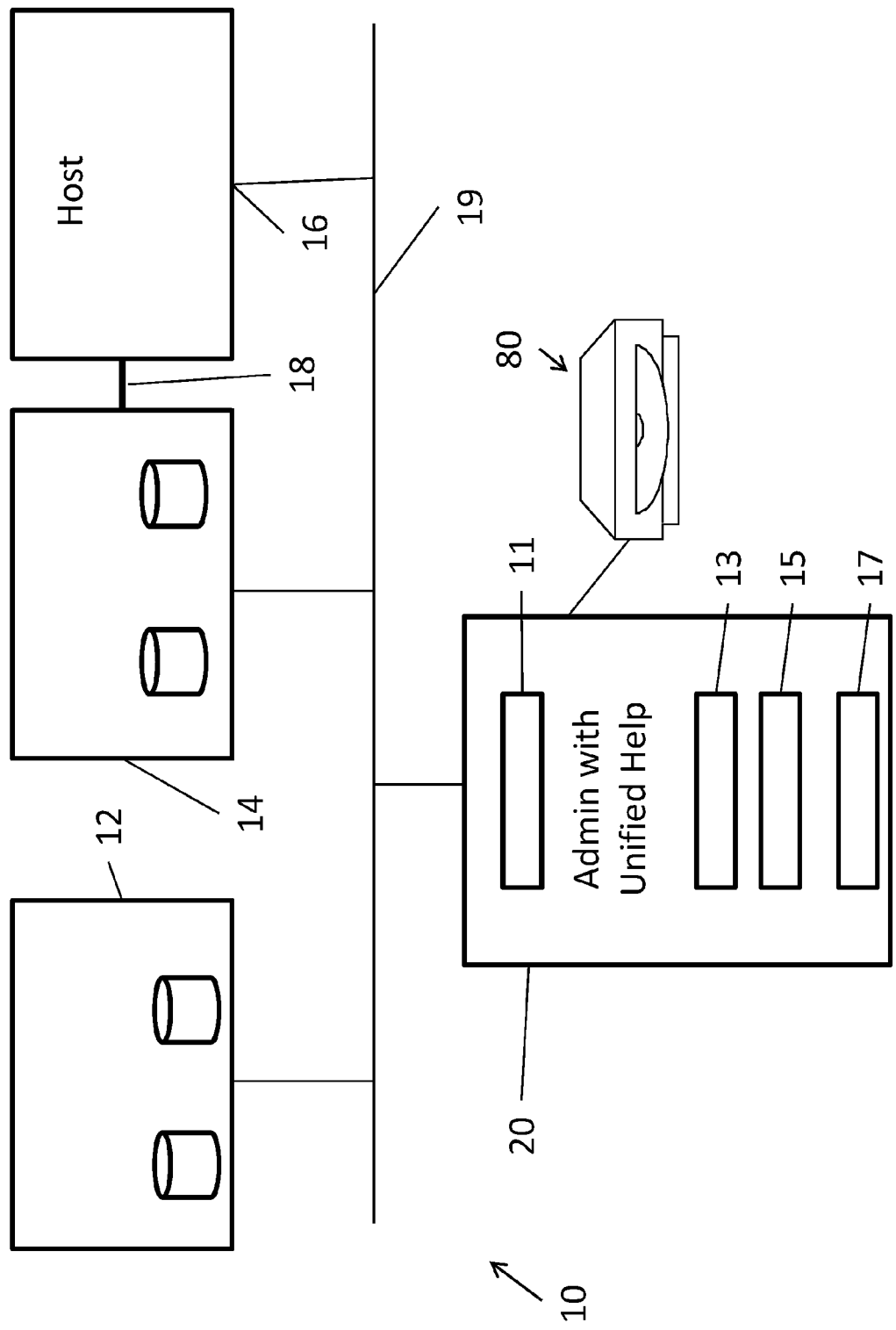
FIG. 1 is a block diagram illustrating an enterprise storage system.

FIG. 1 shows a storage system 10 which provides a unified help service to a user. System 10 includes a first storage platform 12, a second storage platform 14, a host 16 from which the storage systems are storing data, a network 19, and a management server 20.

Network 19 is a network used in a business environment, e.g. Ethernet, Token Ring LAN, etc.

Host 16 is connected to network 19 and is a system configured to process business and/or personal data which requires storage on an external medium. For example, host 16 can be a web host processing retail transactions over the Internet.

First storage platform 12 is connected to network 19 and is a network-based storage platform. A platform which is suitable for use for network-based storage goes under the name Celera™ and is made by EMC Corp. of Hopkinton Mass. First storage system 12 is connected to host 16 over a network, e.g., a local- or wide-area network or the Internet.

Second storage platform 14 is a SAN-based storage platform. A platform which is suitable for use for SAN-based storage goes under the name CLARiiON™ and is made by EMC Corp. of Hopkinton Mass. Second storage platform 14 is connected to host 16 over fiber-channel coupler 18, or over network 19.

Management server 20 is a computer system which includes a processor 13, memory 15 coupled to the processor 13, input/output interface 17 and network interface 11. Management server 20 is connected to first storage platform 12 and second storage platform 14 over network 19. Management server 20 is configured to run applications 22 and 24 [see FIG. 2] which provide, e.g., monitoring services for first storage platform 12 and second storage platform 14, respectively.

Figure 2:
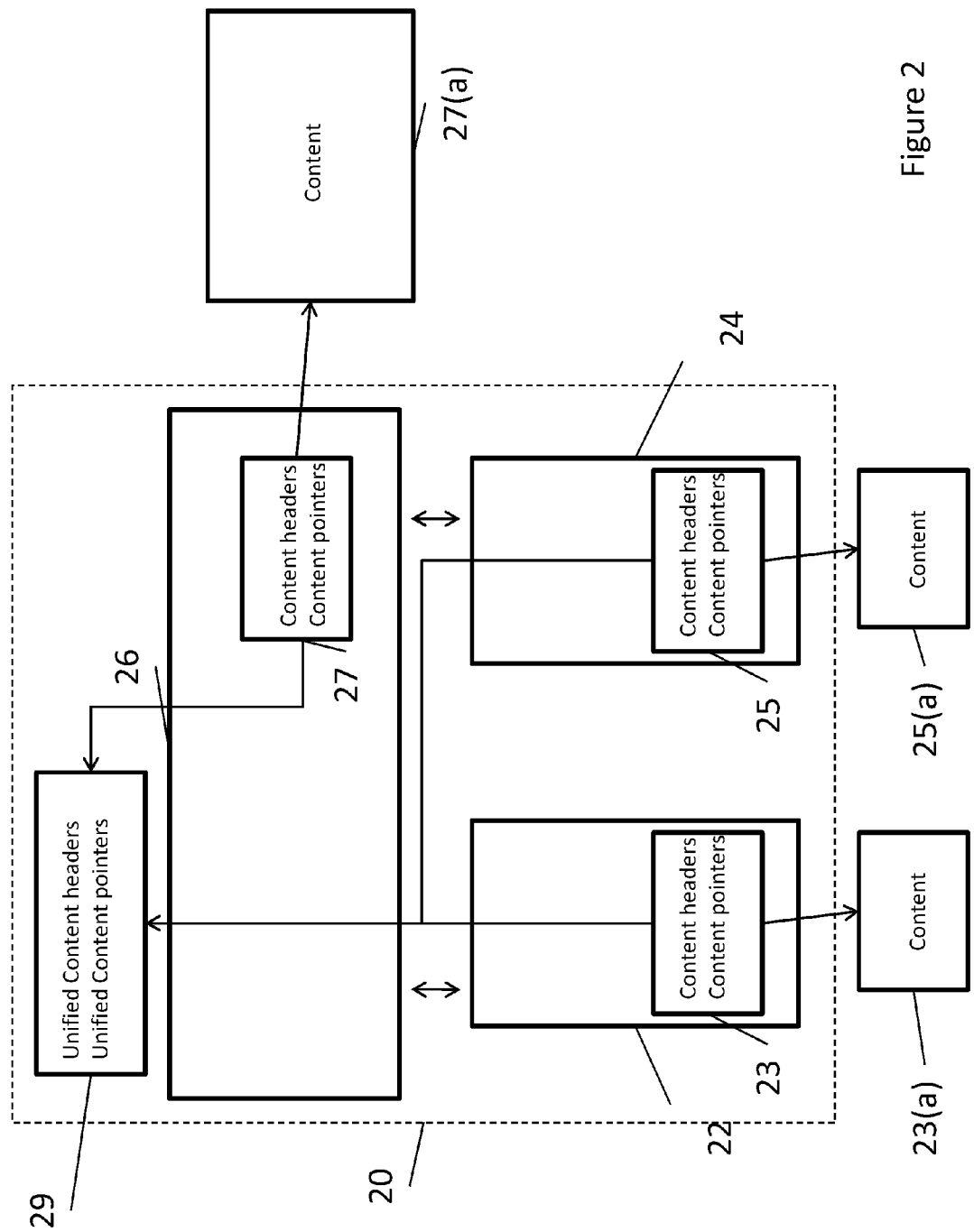
FIG. 2 is a block diagram illustrating a system for managing the enterprise storage system.

On some management servers, applications 22 and 24 can each be connected to a framework application 26 [see FIG. 2] to form a unified application having a single point of entry. The description detailed below will show how the online help services from each application are integrated to form a unified help service accessible from the unified application, the unified help service having a single point of entry.

FIG. 2 shows management server 20 in more detail. Management server 20 is configured to run on processor 13 a first application 22, a second application 24, and a framework application 26.

First application 22 has code stored on memory 15, the code including instructions executed on processor 13 [see FIG. 1] for monitoring activity on first storage platform 12. Further, first application 22 includes an online help service 23.

Second application 24 also has code stored on memory 15 [see FIG. 1], the code including instructions executed on processor 13 for monitoring activity on second storage platform 14. Further, second application 24 includes an online help service 25.

Online help services 23 and 25 each include a lightweight folder which has a set of files referencing content in the form of help libraries which are stored on external content servers 23(a) and 25(a), respectively. The content pointed to by the set of files corresponding to online help service 23 is generally stored on a different content server than the content server which stores the content pointed to by the set of files corresponding to online help service 25. Alternatively, content corresponding to both online help services 23 and 25 can be stored on the same server, or on management server 20.

Content stored on content servers 23(a) and 25(a) and referenced by their respective sets of files are preferably stored in a common format. Such a common format takes the form, for example, of the Enterprise Structured Authoring [ESA] offered by EMC Corp. of Hopkinton, Mass.

Management server 20 also runs a framework application 26. Framework application 26 serves as a single point of entry for first application 22 and second application 24. First application 22 and second application 24 act as "plug-in" applications for framework 26. That is, if, for example, a user wishes to monitor NAS-based platform and a SAN-based platform, instead of running first application 22 and second application 24 separately on management server 20, the user would launch framework application 26 which internally launches first application 22 and second application 24. Output from first application 22 and second application 24 are then viewed within a single view window provided within framework application 26.

Framework application 26 further includes an online help service 27 having content in the form of an online help library, the content stored on a content server 27(a). In a conventional system, launching the online help service 27 from framework application 26 currently produces only the online help service corresponding to framework application 26 alone. That is, in order to access online help service 23 or 25, first application 22 or second application 24, respectively, must be launched separately. In order that this extra step is avoided, the online help services 23, 25, and 27 are integrated into a unified help service accessible from framework application 26.

Instead of this conventional help service, the sets of files corresponding to online help services 23, 25, and 27 are combined into a unified help data structure in a lightweight folder for a unified help service 29 on management server 20. The advantage of integrating the help files which point to help content, rather than the help content itself, is that the integration of the help files results in a lightweight help data structure which is relatively easy to build.

Figure 3:
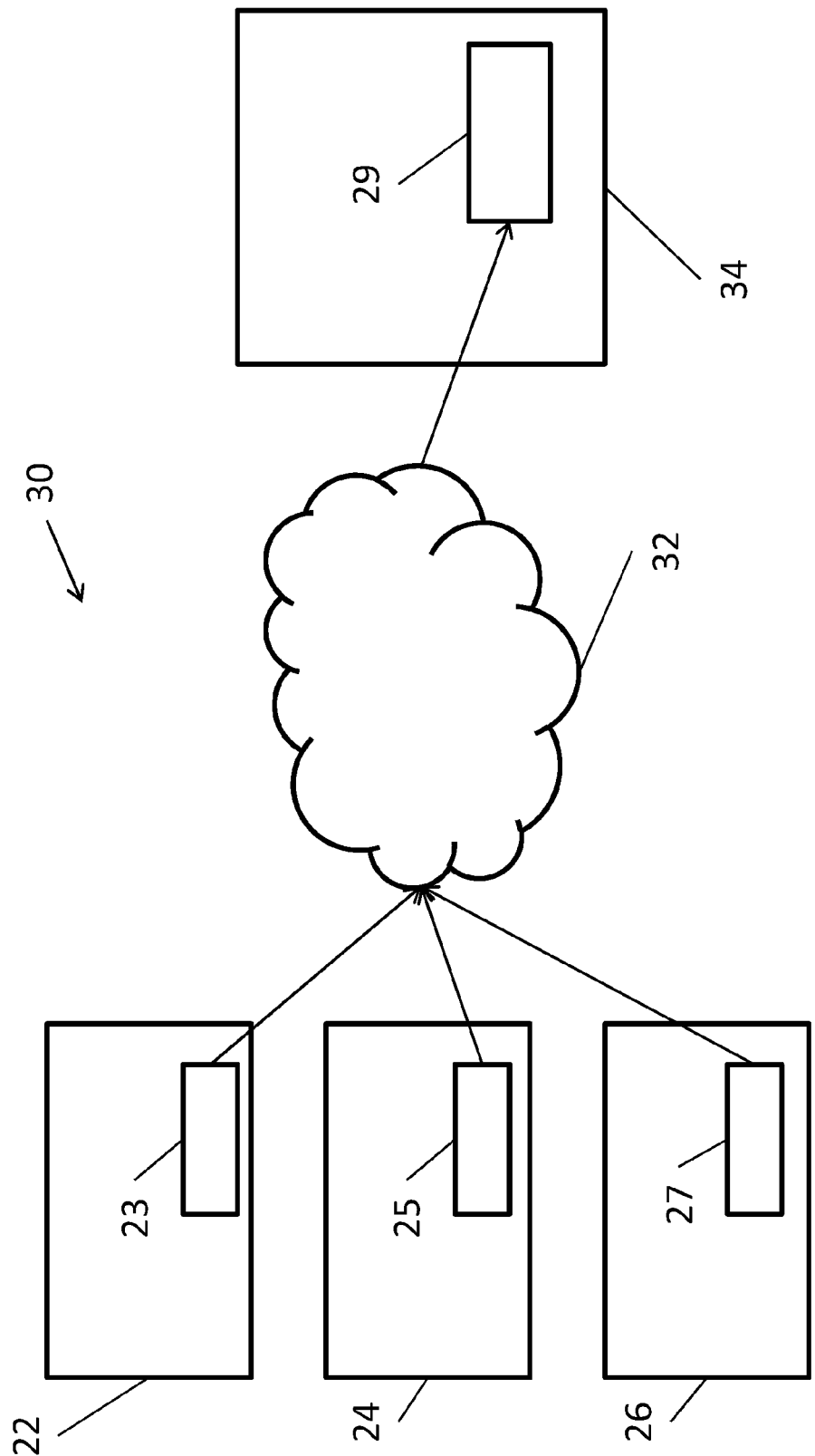
FIG. 3 is a block diagram illustrating a process of generating a unified online help service for the system for managing the enterprise storage system.

FIG. 3 illustrates a procedure 30 for integrating the online help services 23, 25, and 27. Sets of files corresponding to online help services 23, 25, and 27 are integrated into a unified online help service 29 within unified application 34 via a help compiler 32. Help compiler 32 combines the online help libraries associated with online help services 23, 25, and 27. The result is a unified help data structure contained within unified online help service 34

Unified help data structure contains a set of files. The set of files has files which include a set of pointers to database entries in the corresponding content database stored on a content server and a set of content headers, each content header in the set of content headers associated with a pointer in the set of pointers. The pointers preferably take the form of hyperlinks, but can also take the form of, e.g., hexadecimal addresses.

Online help services 23, 25, and 27 provide a graphical user interface [GUI] to support the display of content on input/output interface 17. The GUI preferably takes the form of a navigation view which is a window with two panes. The first pane of the navigation view is used to display items in a list that are highlighted by the user. The second pane in the navigation view is used to display content corresponding to the highlighted item in the first pane. The GUI can be implemented within, e.g., a web browser.

The set of files preferably correspond to an index data file, a table of contents data file, a glossary data file, and a search database data file.

Figure 4:
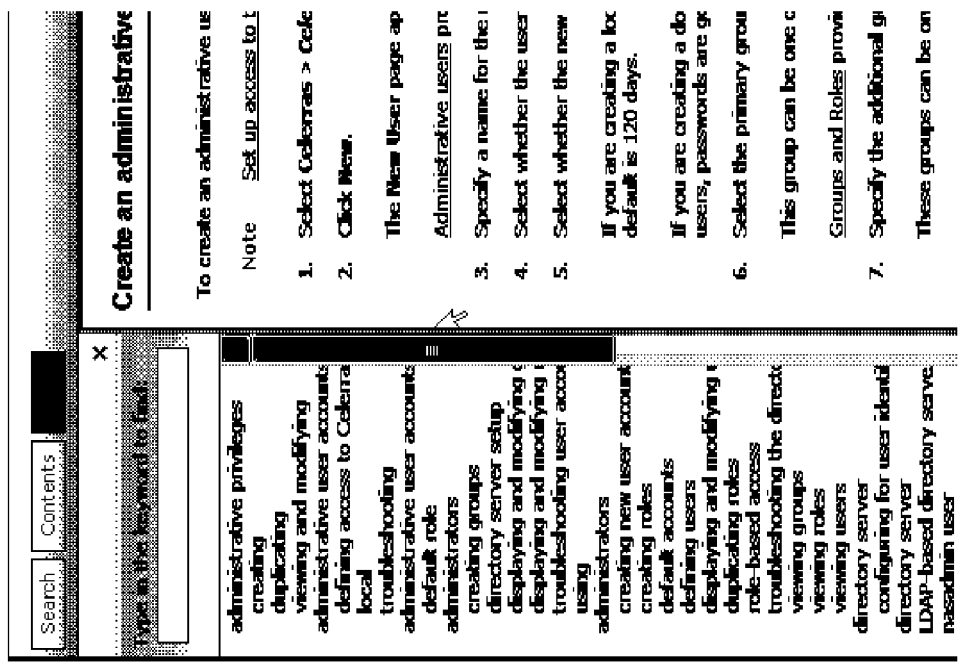
FIG. 4 is a screenshot of a view showing a unified index according to the improved technique.

FIG. 4 illustrates a screenshot 40 representing a navigation view of an index data file. An index data file is constructed and arranged to produce a listing in the first pane of the navigation window that is sorted alphabetically by content header. Some content headers, however, contain subheaders with corresponding pointers to content in the respective content database. These subheaders are preferably arranged between the header to which they correspond and the next header in the alphabetic sort and are also arranged alphabetically. Within the first pane of the navigation view, the subheaders are preferably indented from the headers.

A glossary data file is constructed and arranged to produce a listing in the first pane of the navigation window that is sorted alphabetically by content header.

Figure 5:
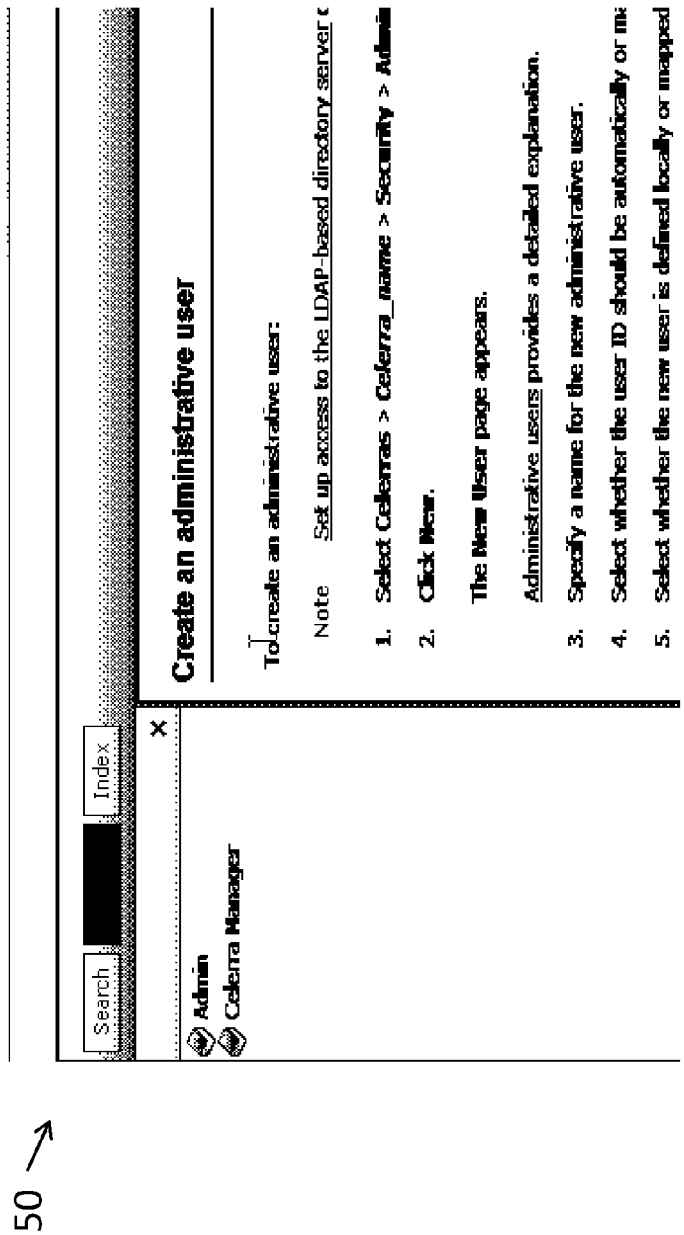
FIG. 5 is a screenshot of a view showing a unified table of content according to the improved technique.

FIG. 5 illustrates a screenshot 50 representing a navigation view of a table of contents data file. A table of contents data file is constructed and arranged to produce a listing of in the first pane of the navigation window that is sorted chronologically, i.e., by chapter as in a book.

Along with the data files described above, there can be summary files corresponding to the data files. Summary files corresponding to a data file have three entries: a start entry, a stop entry, and an integer value denoting the number of entries in the data file.

Figure 6:
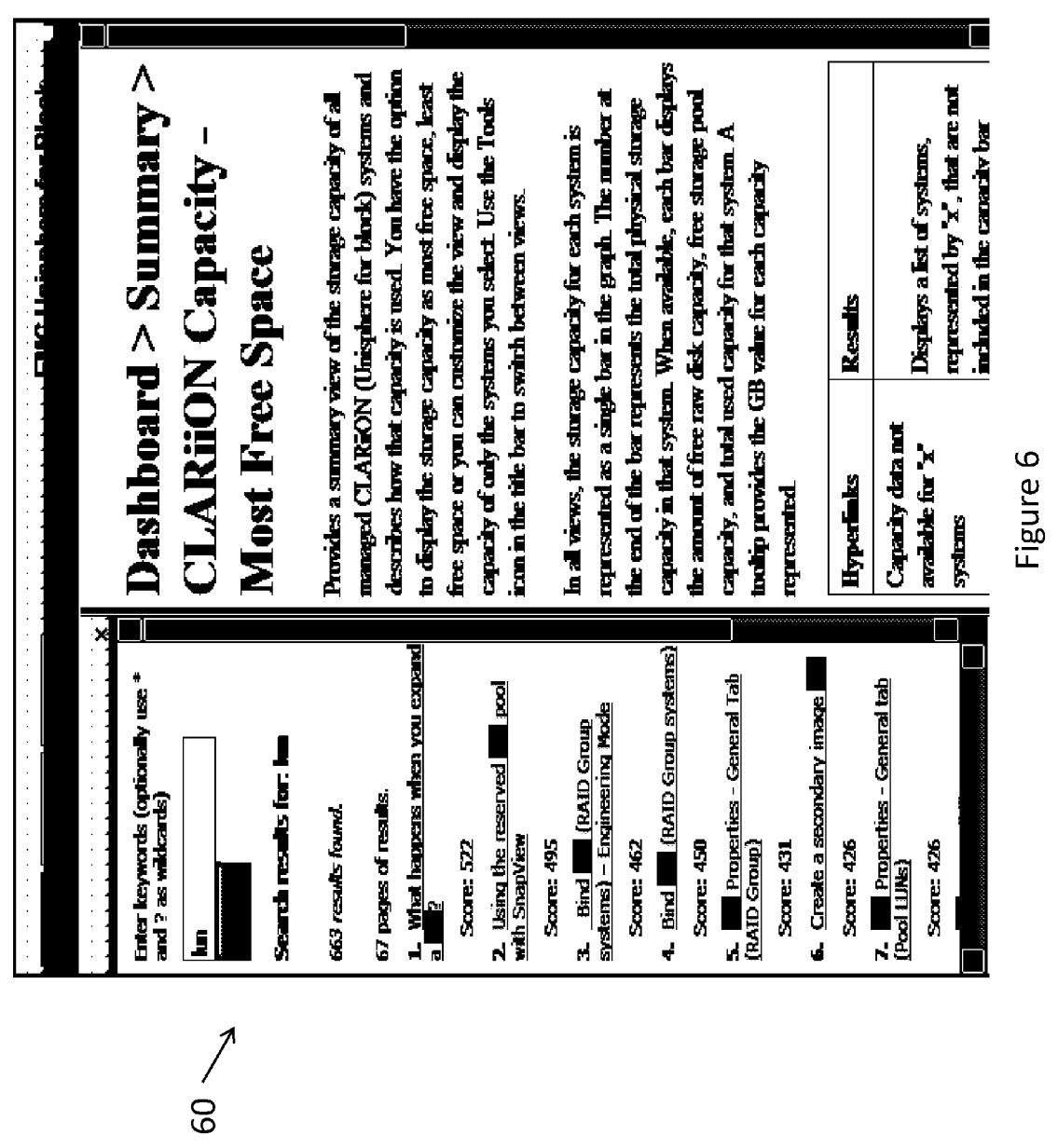

FIG. 6 illustrates a screenshot 60 representing a navigation view of search database data file. A search database data file is constructed and arranged to index search output which is displayed in the first pane of the navigation window based upon a user search string. The search database is built from the existing content using an indexing software package, for example, ZoomSearch.

During operation, processor 13 in management server 20 generates the sets of files corresponding to the online help services 23, 25, and 27. These sets of files, the index data files, the table of contents data files and the glossary data files, corresponding to applications 22, 24, and 26, are moved to a common folder.

Once the sets of files are in a common folder, a unified content database may be constructed. To this effect, the help compiler 32 works to combine corresponding files [i.e., index data files, glossary data files, etc.] into unified data files. The forming of each type of unified data file differs by type; the forming of each type of unified data file is detailed below.

Index data files are unified nominally by amending the set of pointers in each index data file to include the location of the content specified by the content headers relative to the lightweight folder of lists in a memory and combining the sets of content headers and the sets of amended pointers into a unified index data file. Once this is done, however, the result is not a unified index data file, as the content headers need to be placed in alphabetical order. The next step, then, is alphabetically sorting the combined content headers of the unified index data file.

Nevertheless, a situation can arise in which two index data files have identical content headers, but different sets of subheaders corresponding to them. Such a situation is akin to a conflict that would need resolving. Resolving conflicts between identical content subheader pairs in the combined set of content headers nominally takes the form of combining the subheaders. In the instance where there are identical subheaders, a conflict resolution scheme could append the name of the application to the subheader. Other conflict resolution schemes are possible. A resulting unified index data file is illustrated in FIG. 4.

Note also that, as the location of the data files have changed relative to their respective content locations, the pointer values must be updated. An integration algorithm uses a map from the original locations of the set of files to the unified library location to determine the new pointers to the content based upon the pointers in the original data files. Preferably, each lightweight folders with a set of files corresponding to an online help library is located at a single directory level from a root directory in memory 15.

Table of content data files, on the other hand, are arranged chronologically and can be concatenated. One additional step, however, has the name of the application appended to a content header so that the help content corresponding to the different applications are in separate "books", as illustrated in FIG. 5.

Glossary data files are arranged alphabetically, so that after the concatenation step, the contents of the unified file are alphabetized. If there is a conflict [i.e., two identical content headers pointing to different content], then the application name can be appended to the content header.

The integration algorithm can also be used to build unified summary files. The unified summary files each have a start value, a stop value, and a number of values as with each individual summary file.

To complete the unified help data structure, a unified search database is created. In general, ESA tools use the Zoom-Search utility to generate online help search results. This utility uses three java script files: a settings file, a zoom index file, and a zoom page file. These files work together to generate the search output. The format of the index output made it very difficult to combine or process the resulting search output from the various help outputs into an integrated index.

An integrated search algorithm, executed on processor 13, re-indexes the help contents and generates the three java script files across the combined index. That is, the integrated search algorithm reads values from alphanumeric fields of the respective content database entries from each application and the unified help files in the unified help data structure and creates, as one of the lists, an integrated search index to enable the user to search the content databases from the integrated search index. The new java script files are then placed in the unified help 29, help service 23, help service 25, and help service 27. An example of a result from a unified search is illustrated in FIG. 6.

Upon a launch of the unified online help service 34 from unified application 29 a navigation view appears on the GUI as in the individual help services. In this case, however, the navigation view initially renders a single access point for content to the user. The single access point can be, for example, a welcome screen.

The user then updates the navigation view by highlighting, e.g., clicking with a mouse, an element of a list in the first pane, or clicking on a search result. Upon the highlighting of a content header by the user, the content displayed in the second pane changes to the content pointed to by the pointer corresponding to the highlighted content header. The content is determined by the new pointers as described above.

Because the online help is now integrated, functions such as searching are now able to be accessed across different applications. For example, a first search references content across help service 23, while a second search can reference content across help service 25, all within the same navigation window.

Further, a unified context-sensitive help is available. Context-sensitive help is accessed from, e.g., web pages either inside or outside the navigation view. Typically, content is accessed via a hyperlink which invokes a pointer to the content and brings up a navigation view with the content in the second pane.

The unified context-sensitive help is built from context-sensitive help files from the individual applications 22, 24, and 26. In the individual applications 22, 24, and 26, the context-sensitive help files include a map file having a set of pointers to content, a context-sensitive data file including calls to a scripting function defined in the set of unified help files in the electronic help system, the calls passing parameters which include target headers from the set of target headers and pointers from the set of pointers in the map file and a point of entry file including a pointer to a welcome content file.

To build a unified context-sensitive help database, processor 13 generates a context-sensitive data file, map file, and point of entry file corresponding to each of the applications in their respective online help libraries, respectively. The map file are parsed and inserted into a script file in order for to launch the context sensitive help from a user's command.

Unified context-sensitive help is then provided by executing on a processor a call to the scripting function, the execution providing a user with access to content in the navigation view.

Figure 7:
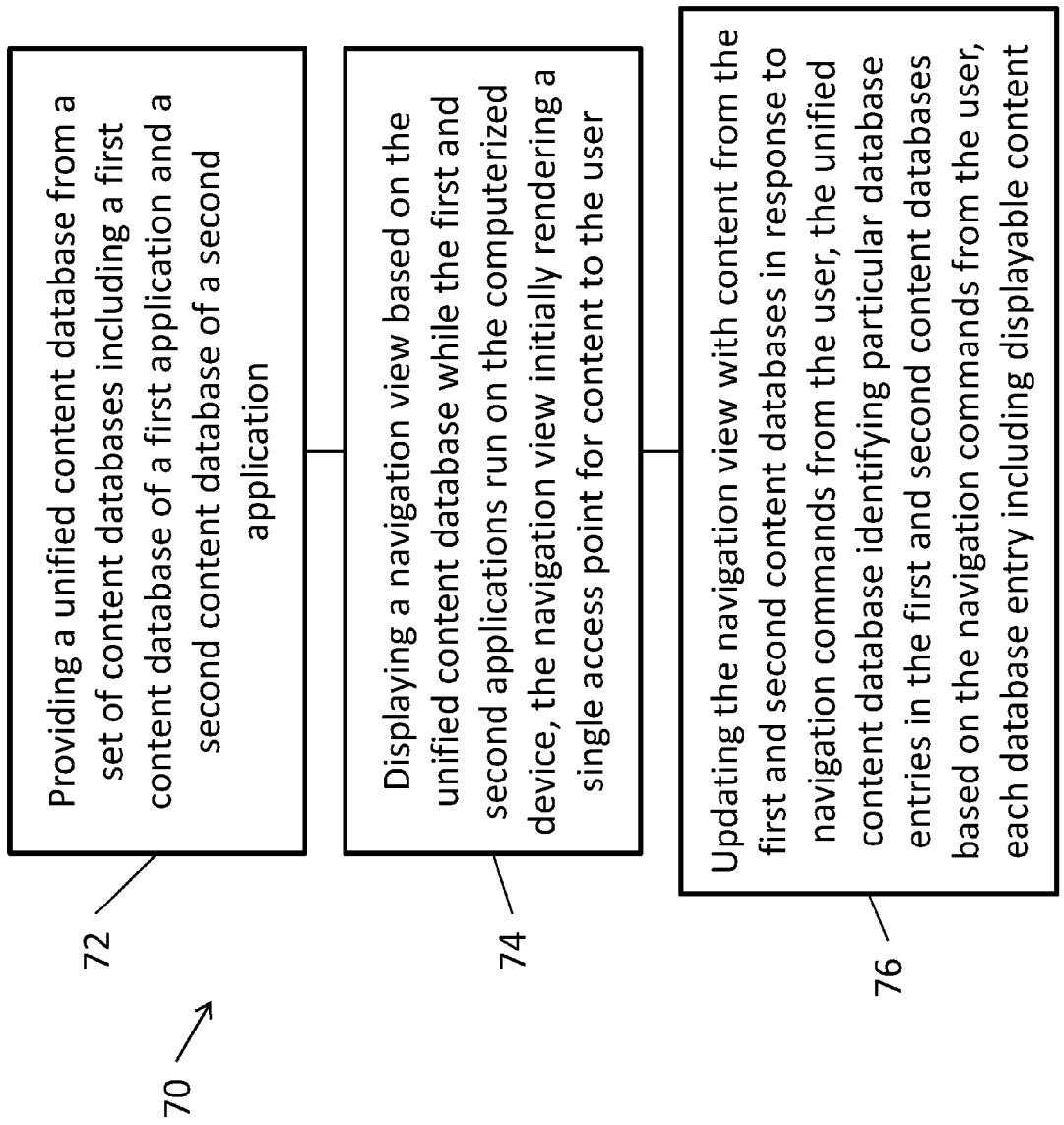
FIG. 7 is a flow chart illustrating a method providing content from a single point of entry to a user according to the improved technique.

FIG. 7 illustrates a method 70 of providing content from a single point of entry to a user. In step 72, a unified content data structure is provided on a computerized device from a set of content databases including a first content database of a first application and a second content database of a second application. In step 74, a navigation view based on the unified content data structure is displayed from the computerized device to the user while the first and second applications run on the computerized device, the navigation view initially rendering a single access point for content to the user. In step 76, the navigation view with content from the first and second content databases is updated in response to navigation commands from the user, the unified content data structure identifying particular database entries in the first and second content databases based on the navigation commands from the user, each database entry including displayable content.

Prior to the providing in step 72, a set of files corresponding to the first and second online help libraries is generated as the unified content data structure. Each file in the set of files includes a set of pointers to database entries stored on a content server and a set of content headers, each content header in the set of content headers associated with a pointer in the set of pointers.

The providing in step 72 takes the form of combining various data files such as an index data file or table of contents data file from the help libraries corresponding to the different applications.

The displaying of the navigation view in step 74 includes displaying, to a GUI, a window with two viewing panes. The first pane can display a list of content headers from the data files or search results, while the second pane displays content corresponding to the content headers.

The updating of the navigation view in step 76 includes highlighting, e.g., clicking with a mouse, an element of a list in the first pane, or clicking on a search result. Upon the highlighting of a content header by the user, the content displayed in the second pane changes to the content pointed to by the pointer corresponding to the highlighted content header. The content is determined by the new pointers as described above.

While various embodiments of the invention have been particularly shown and described, it will be understood by those skilled in the art that various changes in form and details may be made therein without departing from the spirit and scope of the invention as defined by the appended claims.

For example, it should be understood that some embodiments are directed to an electronic environment which utilizes system 10 that provides content from a single point of entry to a user. Some embodiments are directed to system 10. Some embodiments are directed to a process of providing content from a single point of entry to a user. Also, some embodiments are directed to a computer program product which enables computer logic to perform the providing of content from a single point of entry to a user. In some arrangements, system 10 is implemented by a set of processors or other types of control/processing circuitry running software. In such arrangements, the software instructions can be delivered to system 10 in the form of a computer program product [illustrated generally by a diskette icon 80 in FIG. 1] having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method of providing content from a single point of entry to a user, the method comprising:
   providing, on a computerized device, a unified content data structure from a set of content databases including a first content database of a first application and a second content database of a second application;
   displaying, from the computerized device to the user, a navigation view based on the unified content data structure while the first and second applications run on the computerized device, the navigation view initially rendering a single access point for content to the user; and
   updating the navigation view with content from the first and second content databases in response to navigation commands from the user, the unified content data structure identifying particular database entries in the first and second content databases based on the navigation commands from the user, each database entry including displayable content.

2. A method as in claim 1 wherein the first application is a first data storage program which is constructed and arranged to communicate with a first data storage platform;
   wherein the first content database is a first online help library of the first data storage program;
   wherein the second application is a second data storage program which is constructed and arranged to communicate with a second data storage platform;
   wherein the second content database is a second online help library of the second data storage program; and
   wherein the method further comprises:
      generating, as the unified content data structure, prior to providing the unified content data structure on the computerized device, a set of files corresponding to each of the first and second online help libraries, each set of files located within a lightweight folder, each file in each set of files including:
         a set of pointers to database entries stored on a content server; and
         a set of content headers, each content header in the set of content headers associated with a pointer in the set of pointers.

3. A method as in claim 2, wherein each set of files includes an index data file;
   wherein the set of content headers in each index data file includes:
      an alphabetically sorted list of content subheaders and content names; and
      for each content subheader in the alphabetically sorted list of content subheaders, an alphabetically sorted list of content names;
   wherein providing a unified content data structure includes:

amending the set of pointers in each index data file to include the location of the content specified by the content headers relative to the location of the lightweight folder;
combining the sets of content headers and the sets of amended pointers into a unified index data file;
alphabetically sorting the combined content headers of the unified index data file; and
resolving conflicts between identical content subheader pairs in the combined set of content headers.

4. A method as in claim 3,
wherein resolving conflicts between the identical content subheader pairs in the combined set of content headers includes:
appending a name of the first application to a first subheader of the identical content subheader pairs, and appending a name of the second application to a second subheader of the identical content subheader pairs.

5. A method as in claim 2, wherein each set of files includes a table of contents data file;
wherein the set of content headers in the table of contents data file includes a chronologically sorted list of content titles;
wherein providing a unified content database includes:
amending the set of content headers in each table of contents data file to include a reference to the software component to which the table of contents data file corresponds;
amending the set of pointers in each index data file to include the location of the content specified by the content headers relative to the location of the lightweight folder; and
combining the sets of content headers and the sets of amended pointers into a unified index data file.

6. A method as in claim 2, wherein each set of files includes a glossary data file;
wherein the set of content headers in the glossary data file includes an alphabetically sorted list of content titles;
wherein providing a unified content database includes:
amending the set of pointers in each index data file to include the location of the content specified by the content headers relative to the location of the lightweight folder; and
combining the sets of content headers and the sets of amended pointers into a unified index data file; and
alphabetically sorting the combined content headers of the unified index data file.

7. A method as in claim 2, wherein the unified content data structure includes a set of unified help files;
wherein the method further includes copying the set of unified help files to each lightweight folder corresponding to the first and second online help libraries; and
wherein providing a unified content database includes:
reading values from alphanumeric fields of the respective database entries in the first and second online help libraries and creating, as one of the lists, an integrated search index to enable the user to search both of the first and second online help libraries from the integrated search index.

8. A method as in claim 7, wherein displaying a navigation view based on the unified content data structure includes displaying a list of items in a first frame in a window, the list of items corresponding to the set of content headers in a file from the set of unified help files;
wherein a navigation command from the user includes highlighting, in the window, an item in the list of items displayed in the first frame in the window; and
wherein displaying a navigation view based on the unified content data structure further includes displaying, in a second frame in the window, the content stored on a content server pointed to by the pointer from the set of pointers within the set of unified help files.

9. A method as in claim 8 wherein updating the navigation view with the content from the first and second content databases in response to the navigation commands from the user includes:
receiving a first search command from the user and, based on a first lookup from the integrated search index in response to the first search command outputting first content in the second frame in the window from the first online help library, and
receiving a second search command from the user and, based on a second lookup from the integrated search index in response to the second search command outputting second content in the second frame in the window from the second online help library.

10. A method according to claim 7, wherein the set of unified help files includes:
a map file including a set of target headers and a set of pointers to locations of content;
a context-sensitive data file including calls to a scripting function defined in the set of unified help files in the electronic help system, the calls passing parameters which include target headers from the set of target headers and pointers from the set of pointers in the map file; and
a point of entry file including a pointer to a welcome content file;
wherein generating a set of files corresponding to each of the first and second online help libraries includes:
placing each context-sensitive data file, map file, and point of entry file corresponding to each of the first application and the second application into each of the lightweight folders corresponding to the first and second online help libraries, respectively.

11. A method according to claim 10, further comprising:
executing on a processor a call to the scripting function, the execution providing a user with access to content in the navigation view.

12. A method as in claim 2, wherein the first data storage program has executable code stored in memory in the computerized device and which is configured to run on a processor of the computerized device to monitor activity on the first storage platform;
wherein the second data storage program has executable code stored in memory in the computerized device and which is configured to run on a processor of the computerized device to monitor activity on the second storage platform while the first data storage program simultaneously runs;
wherein generating the set of files corresponding to each of the first and second online help libraries includes:
producing, as the set of pointers, a set of locations in the first content database and the second content database, each location of the set of locations pointing to content referencing monitoring activity on the first storage platform and the second storage platform.

13. A method as in claim 12,
wherein updating the navigation view with content from the first and second content databases in response to navigation commands from the user includes:

receiving, from the user, a request to update the navigation view, the request having been generated by the user via mouse clicks on a desktop on which the navigation view is being displayed.

14. An apparatus configured to provide content from a single point of entry to a user, the apparatus comprising:
a network interface;
an input/output device;
a memory; and
a processor coupled to the memory;
wherein the processor is configured to:
provide a unified content data structure from a set of content databases including a first content database of a first application and a second content database of a second application, the set of content databases accessed via the network interface, the first application and second application accessed from the memory;
display, on the input/output device, a navigation view based on the unified content data structure while the first and second applications run on the computerized device, the navigation view initially rendering a single access point for content to the user; and
update the navigation view with content from the first and second content databases in response to navigation commands from the user, the unified content data structure identifying particular database entries in the first and second content databases based on the navigation commands from the user, each database entry including displayable content.

15. An apparatus as in claim 14 wherein the first application is a first data storage program which is constructed and arranged to communicate with a first data storage platform via the network interface;
wherein the first content database is an first online help library of the first data storage program;
wherein the second application is a second data storage program which is constructed and arranged to communicate with a second data storage platform via the network interface;
wherein the second content database is a second online help library of the second data storage program; and
wherein the processor is further configured to:
as the unified content data structure, prior to providing the unified content data structure on the computerized device, a set of files corresponding to each of the first and second online help libraries, each set of files located within a lightweight folder, each file in the set of files including:
a set of pointers to database entries stored on a content server; and
a set of content headers, each content header in the set of content headers associated with a pointer in the set of pointers.

16. An apparatus as in claim 15, wherein the set of files includes an index data file;
wherein the set of content headers in each index data file includes:
an alphabetically sorted list of content subheaders and content names; and
for each content subheader in the alphabetically sorted list of content subheaders, an alphabetically sorted list of content names;
wherein providing a unified content data structure includes:
amending the set of pointers in each index data file to include the location of the content specified by the content headers relative to the lightweight folder of lists in a memory;
combining the sets of content headers and the sets of amended pointers into a unified index data file;
alphabetically sorting the combined content headers of the unified index data file; and
resolving conflicts between identical content subheader pairs in the combined set of content headers.

17. An apparatus as in claim 15, wherein the set of files includes a table of contents data file;
wherein the set of content headers in each table of contents data file includes a chronologically sorted list of content titles;
wherein providing a unified content data structure includes:
amending the set of content headers in each table of contents data file to include a reference to the software component to which the table of contents data file corresponds;
amending the set of pointers in each index data file to include the location of the content specified by the content headers relative to the lightweight folder of lists in a memory; and
combining the sets of content headers and the sets of amended pointers into a unified index data file.

18. An apparatus as in claim 15, wherein the set of files includes a glossary data file;
wherein the set of content headers in each glossary data file includes an alphabetically sorted list of content titles;
wherein providing a unified content data structure includes:
amending the set of pointers in each index data file to include the location of the content specified by the content headers relative to the lightweight folder of lists in a memory; and
combining the sets of content headers and the sets of amended pointers into a unified index data file; and
alphabetically sorting the combined content headers of the unified index data file.

19. A computer program product having a non-transitory computer readable storage medium which stores code to provide content from a single point of entry to a user, the code including instructions to:
provide a unified content data structure from a set of content databases including a first content database of a first application and a second content database of a second application;
display a navigation view based on the unified content data structure while the first and second applications run on the computerized device, the navigation view initially rendering a single access point for content to the user; and
update the navigation view with content from the first and second content databases in response to navigation commands from the user, the unified content data structure identifying particular database entries in the first and second content databases based on the navigation commands from the user, each database entry including displayable content.

20. A computer program product as in claim 19 wherein the first application is a first data storage program which is constructed and arranged to communicate with a first data storage platform via the network interface;
wherein the first content database is an first online help library of the first data storage program;

wherein the second application is a second data storage program which is constructed and arranged to communicate with a second data storage platform via the network interface;

wherein the second content database is a second online help library of the second data storage program; and wherein the code further provides instructions to:

generate, as the unified content data structure, prior to providing the unified content data structure on the computerized device, a set of files corresponding to each of the first and second online help libraries, each set of files located within a lightweight folder, each file in the set of files including:

a set of pointers to database entries stored on a content server; and a set of content headers, each content header in the set of content headers associated with a pointer in the set of pointers.

21. A computer program product as in claim 20, wherein the set of files includes an index data file;

wherein the set of content headers in each index data file includes:

an alphabetically sorted list of content subheaders and content names; and for each content subheader in the alphabetically sorted list of content subheaders, an alphabetically sorted list of content names;

wherein providing a unified content data structure includes:

amending the set of pointers in each index data file to include the location of the content specified by the content headers relative to the lightweight folder of lists in a memory;

combining the sets of content headers and the sets of amended pointers into a unified index data file;

alphabetically sorting the combined content headers of the unified index data file; and resolving conflicts between identical content subheader pairs in the combined set of content headers.

22. A computer program product as in claim 20, wherein the set of files includes a table of contents data file;

wherein the set of content headers in each table of contents data file includes a chronologically sorted list of content titles;

wherein providing a unified content data structure includes:

amending the set of content headers in each table of contents data file to include a reference to the software component to which the table of contents data file corresponds;

amending the set of pointers in each index data file to include the location of the content specified by the content headers relative to the lightweight folder of lists in a memory; and combining the sets of content headers and the sets of amended pointers into a unified index data file.

23. A computer program product as in claim 20, wherein the set of files includes a glossary data file;

wherein the set of content headers in each glossary data file includes an alphabetically sorted list of content titles;

wherein providing a unified content data structure includes:

amending the set of pointers in each index data file to include the location of the content specified by the content headers relative to the lightweight folder of lists in a memory; and combining the sets of content headers and the sets of amended pointers into a unified index data file; and alphabetically sorting the combined content headers of the unified index data file.

\* \* \* \* \*